(12) United States Patent
Tuskes

(10) Patent No.: US 10,060,546 B2
(45) Date of Patent: Aug. 28, 2018

(54) SOLENOID VALVE

(71) Applicant: KONGSBERG AUTOMOTIVE AB, Mullsjoe (SE)

(72) Inventor: Milan Tuskes, Munich (DE)

(73) Assignee: KONGSBERG AUTOMOTIVE AB, Mullsjoe (SE)

( * ) Notice: Subject to any disclaimer, the term of this patent is extended or adjusted under 35 U.S.C. 154(b) by 10 days.

(21) Appl. No.: 15/127,694

(22) PCT Filed: Apr. 9, 2014

(86) PCT No.: PCT/EP2014/057165
§ 371 (c)(1),
(2) Date: Sep. 20, 2016

(87) PCT Pub. No.: WO2015/154803
PCT Pub. Date: Oct. 15, 2015

(65) Prior Publication Data
US 2017/0146150 A1 May 25, 2017

(51) Int. Cl.
*F16K 31/02* (2006.01)
*F16K 31/08* (2006.01)
(Continued)

(52) U.S. Cl.
CPC ............ *F16K 31/082* (2013.01); *B60N 2/448* (2013.01); *B60N 2/4415* (2013.01); *B60N 2/914* (2018.02);
(Continued)

(58) Field of Classification Search
CPC .... F16K 31/082; F16K 11/044; F16K 11/052; B60N 2/448; B60N 2/4415; H01F 2007/208
(Continued)

(56) References Cited

U.S. PATENT DOCUMENTS

| | | | | |
|---|---|---|---|---|
| 698,483 | A | * | 4/1902 | Hook ................... F16K 11/044 137/107 |
| 2,739,613 | A | * | 3/1956 | Kulikoff ................. F15B 13/04 137/625.27 |

(Continued)

FOREIGN PATENT DOCUMENTS

| | | |
|---|---|---|
| DE | 4412573 A1 | 6/1995 |
| DE | 29711175 U1 | 7/1998 |

(Continued)

OTHER PUBLICATIONS

International Search Report and Written Opinion for Application No. PCT/EP2014/057165 dated Jan. 14, 2015; 12 pgs.

*Primary Examiner* — Minh Le
(74) *Attorney, Agent, or Firm* — Cantor Colburn LLP

(57) ABSTRACT

The present relation is directed to solenoid valve comprising an input port including a spring biased input sealing tip, a first and second output port. The second output port including an output sealing tip, and a solenoid coil arrangement for generating magnetic fields which result in a force either on the input sealing tip or the output sealing tip. Wherein the solenoid valve arrangement consists of a single solenoid coil, that includes a permanent magnet movable in a first and second axial direction by a magnetic field. The permanent magnet being connected to the input sealing tip and to the output sealing tip such that movement of the permanent magnet in the first direction pulls the input sealing tip to open the input port and movement of the permanent magnet in the opposite direction pulls the output sealing tip to open the second output port.

12 Claims, 8 Drawing Sheets

(51) Int. Cl.
  *F16K 11/044* (2006.01)
  *F16K 11/052* (2006.01)
  *B60N 2/44* (2006.01)
  *B60N 2/90* (2018.01)

(52) U.S. Cl.
  CPC ............ B60N 2/976 (2018.02); F16K 11/044 (2013.01); F16K 11/052 (2013.01)

(58) Field of Classification Search
  USPC ..... 137/596.17, 625.25, 625.64; 251/129.15, 251/129.21; 335/205, 229, 266, 268, 302
  See application file for complete search history.

(56) References Cited

U.S. PATENT DOCUMENTS

| | | | | |
|---|---|---|---|---|
| 3,203,447 A | * | 8/1965 | Bremner | F16K 31/0627 137/595 |
| 3,779,280 A | * | 12/1973 | Evans | F16K 11/044 137/625.5 |
| 4,559,971 A | | 12/1985 | Bradshaw | |
| 4,647,009 A | * | 3/1987 | Idogaki | H02K 26/00 251/129.05 |
| 4,655,255 A | * | 4/1987 | Rode | F16K 31/0606 137/596.17 |
| 5,094,260 A | * | 3/1992 | Stuart | G05D 16/202 137/102 |
| 5,189,991 A | * | 3/1993 | Humburg | F16K 31/0675 123/41.1 |
| 5,238,023 A | * | 8/1993 | Olofsson | F16K 7/18 137/596.17 |
| 6,026,860 A | * | 2/2000 | Teichmann | F16K 31/06 137/870 |
| 6,158,713 A | | 12/2000 | Ohya et al. | |
| 6,382,256 B2 | * | 5/2002 | Kim | F16K 11/048 137/870 |
| 6,836,201 B1 | * | 12/2004 | Devenyi | H01F 7/1816 335/229 |
| 8,613,421 B2 | * | 12/2013 | Ams | F16K 31/0682 137/625.42 |
| 8,627,883 B2 | * | 1/2014 | Richards | E21B 34/066 137/870 |
| 8,794,718 B2 | * | 8/2014 | Bensch | B60T 8/362 137/596.1 |
| 9,046,187 B2 | * | 6/2015 | Wygnanski | F16K 31/0682 |
| 9,092,038 B2 | * | 7/2015 | Schuler | F16K 11/161 |
| 2004/0238053 A1 | * | 12/2004 | Baarda | F16K 31/082 137/869 |
| 2005/0279415 A1 | | 12/2005 | Xu et al. | |

FOREIGN PATENT DOCUMENTS

| | | | |
|---|---|---|---|
| DE | 102012011975 A1 | 12/2013 | |
| EP | 1653132 A1 * | 5/2006 | ............ F16K 11/044 |
| EP | 1988440 A1 | 11/2008 | |
| WO | 2006125259 A1 | 11/2006 | |

* cited by examiner

US 10,060,546 B2

SOLENOID VALVE

CROSS REFERENCE TO RELATED APPLICATIONS (IF APPLICABLE)

The present application is a 371 National Stage application of PCT Application No. PCT/EP2014/057165, filed on Apr. 9, 2014, the contents of which are incorporated by reference herein.

BACKGROUND OF THE DISCLOSURE

The present invention is directed to a solenoid valve, the solenoid valve comprising an input port including an input sealing tip which is spring biased for closing it, a first output port, and a second output port to the environment including an output sealing tip which is spring biased for closing it, and a solenoid coil arrangement for selectively generating magnetic fields which result in a force either on the input sealing tip to pull it away from the input port for opening it or a force on the output sealing tip to pull it away from this second output port for opening it. In particular the present invention is directed to a solenoid valve for controlling inflation and deflation of an air cell in a vehicle seat, the input port of the solenoid valve being adapted for connection to a source of pressurized air and the first output port being connected to the air cell.

Drivers and passengers of motor vehicles, especially when driving long distances, often experience discomforts caused by long time static posture when seated in a vehicle seat. This is not only felt as being uncomfortable and causing for example back pain but may also lead to permanent impairment of health, in particular for professional drivers such as taxi, truck and bus drivers. To provide a remedy the automotive industry since sometime offers vehicle seats with adjustable lumbar air supports and bolsters and with integrated massage systems in the seat back. The lumbar supports and bolsters in the seat are adjusted by inflating air cells by inflating them with pressurized air and closing them in the desired state. In massage systems series of air cells are sequentially inflated and deflated to provide a massage effect.

Valves are used to control the air supply to the air cells in the vehicle seat. For the lumbar supports, side supports and bolsters valves of the normally closed type are utilized. Such normally closed valves have two independently controllable valve elements for selectively either opening input port to let pressurized air to a first output port connected to the air cell, or by connecting a second output open to the environment so that pressurized air can flow out of the air cell for deflating it. In the inactivated state the input port and the second output port to the environment are closed. The solenoid valve of the present invention is of the normally closed type and is therefore rather suitable for application in connection with lumbar supports, side supports and bolsters and the like. However, in principle the valves of the present invention can also be utilized in massage systems for vehicle seats.

A solenoid valve comprising the features of the preamble of claim 1 is described in WO 2013/011340 A1. The solenoid coil arrangement comprises two coaxially disposed solenoid coils. In each of the adjacent solenoid coils a moveable plunger is received. If the first solenoid coil is activated by supplying voltage its plunger is moved in an axial direction of the coil in the direction towards the end adjacent to the other solenoid coil. If the opposite second solenoid coil is activated to generate an oppositely directed magnetic field the plunger of the second solenoid coil is moved in axial direction of the second solenoid coil in the direction to-wards its end adjacent to the first solenoid coil. The first plunger is connected to an input sealing tip which is spring biased to seal the input port of the valve, and the second plunger to an output sealing tip which is spring biased to seal the second output port of the valve to the environment. By energizing the first solenoid coil the plunger is moved further into the first solenoid coil and thereby also moves the input sealing tip away from the input port of the valve to open it, and by energizing the second solenoid coil its plunger is moved further into the second solenoid coil which in turn moves the output sealing tip away from the second output port to open it to the environment.

Such an arrangement is schematically shown in FIG. 13. The solenoid valve comprises a sealed housing 100 in which a first solenoid coil 101 and oppositely and coaxially to it a second solenoid coil 111 is arranged. The first solenoid coil 101 is surrounded by an iron frame 103. In the interior of the first solenoid coil 101 an iron plunger 102 is ex-tending which is connected to an output sealing tip 105. A spring 104 is acting on the iron plunger 102 such that the output sealing tip 105 is pressed into its sealing position closing the second output port. Likewise the second solenoid coil 111 is surrounded by an iron frame 113, and is provided with an iron plunger 112 which is spring biased by spring 114 acting on it such that an input sealing tip 115 carried at its outer end is pressed onto the input port of the valve housing 100 to close it. The two solenoid coils 101 and 111 are operated independently. In operation, only one of the two solenoid coils is activated at a time. When the first solenoid coil 101 is activated by supplying voltage to it the magnetic field generated results in a force on the iron plunger 102 such that it is moved against the bias force of the spring 104 to move further into the interior of the first solenoid coil 101. In this situation the second output port of the valve is opened such that pressurized air can flow through the first output port connected to the air cell and through the valve housing to the second output port and to the environment to deflate the air cell. If in turn the second solenoid coil 111 is activated, while the first solenoid coil 101 remains inactivated, the magnetic field generated by the second solenoid coil draws the iron plunger 113 further into the interior of the second solenoid coil 111 such that the input sealing tip 115 carried at the outer end of the iron plunger 113 is lifted off the input port of a valve housing 100 such that pressurized air may flow through the housing to the first output port connected to the air cell for inflating it. For operating the valve, in principle a voltage supply delivering voltage of a single polarity is sufficient since the terminals of the solenoid coils may be connected such that they generate of opposite polarity.

BRIEF DESCRIPTION OF THE DISCLOSURE

It is an object of the present invention to provide a solenoid valve is more compact and has less weight than the valves used so far, in particular to provide such solenoid valve for inflating and deflating an air cell in a vehicle seat.

This object is achieved by the solenoid valve comprising the features of claim 1. Preferred embodiments of the invention are set out in the dependent claims.

According to the present invention the solenoid valve comprises a single solenoid coil, and a permanent magnet is disposed moveably in axial direction of the solenoid coil to be driven by a magnetic field of the solenoid coil of a first north south pole orientation to move in a first axial direction of the solenoid coil, and by a magnetic field of opposite north south pole orientation to move in a second direction opposite to the first direction the magnetic fields with the first and second north south pole orientation are generated by supplying voltage to the solenoid coil of a first polarity and of a second polarity opposite to the first polarity, respectively. The permanent magnet is connected to the input sealing tip and to the output sealing tip such that movement of the permanent magnet in the first direction pulls the input sealing tip away from the input port to open it while the second output port remains closed, and movement of the permanent magnet in the opposite direction pulls the output sealing tip away from the second out-put port to open it while the input port remains closed.

With this design a single solenoid coil is sufficient to operate the solenoid valve to open and close its two normally closed ports, instead of the two independent solenoid coils of the prior art valves. This allows to reduce size and weight of the valve by almost 50%. The control circuitry for operating the solenoid valve has to be arranged to be able to selectively deliver voltages of a positive and negative polarity. However, the advantages of the present invention by far out weight this need to provide an extra functionality for providing voltages of a selected polarity. The ad-vantages of a more compact design and less weight are accompanied by reduced material amounts needed for manufacturing and lower manufacturing costs, whereas the advantages of traditional solenoid valves, such as reliable and noiseless operation and performance independent on environmental temperatures, are likewise achieved by the solenoid valve of the present invention.

If is noted that the above-mentioned permanent magnet can be formed of one or more bodies of magnetic material, for example a pair of magnetic bodies arranged serially.

In a preferred embodiment a first permanent magnet is dis-posed with a first half of the solenoid coil with its north pole pointing in an axial direction of the solenoid coil, and a second permanent magnet is disposed in the opposite half of the solenoid coil with its north pole pointing in the opposite axial direction of the solenoid coil. For a given polarity of the voltage that is applied to the solenoid coil both permanent magnets will then be moved in the same axial direction by the magnetic field generated by the solenoid coil.

According to a further preferred embodiment the first permanent magnet is provided with a plunger rod projecting out of the solenoid coil and extending in the direction towards the second output port and carrying the output sealing tip, and that the second permanent magnet is connected to a second plunger rod projecting out of the other end of the solenoid coil and extending towards the input port and carrying the input sealing tip at its other end, wherein a spring arrangement is provided which results in a spring bias force urging the plunger rod with the output sealing tip to the second output port and urging the plunger rod with the input sealing tip to the input port. In particular, this spring arrangement may comprise a spring acting between the first and second permanent magnets urging them away from each other.

Alternatively the first and second permanent magnets are connected to each other, and springs are acting on the input sealing tip and on the output sealing tip to urge them to-wards the input port and towards the second output port, respectively.

In a preferred embodiment the permanent magnet is connected to the input sealing tip by a flexible cord and is connected to the output sealing tip by a second flexible cord extending in the opposite direction to the first cord, and in that springs are arranged to exert bias force on the input sealing tip towards the input port and on the output sealing tip towards the second output port. The length of the first and second cords are dimensioned such that the first and second cords are under no tension when the solenoid coil is inactivated, and that a respective one of the sealing tips is lifted off its port by a pulling force exerted through the respective cord when the solenoid coil is activated by a voltage of a respective polarity. This is achieved when the lengths of the cords is such that the cord is loose when the permanent magnet is in its rest position in the inactivated solenoid coil; on the other hand, the length of the cord is short enough so that, when the permanent magnet is moved in one axial direction by generation of magnetic field of a first polarity, one of the cords is tensioned and pulls the respective sealing tip away from its port.

In a preferred embodiment the permanent magnet is provided with a first plunger rod extending therefrom towards the in-put sealing tip and a second plunger rod extending therefrom in the opposite direction towards the output sealing tip. The input sealing tip is spring biased to be pressed onto the input port opening from the outside of the valve housing, and the output sealing tip is spring biased to be pressed on the second output port opening from the outside of the valve housing. The plunger rods each have a sufficient length such that the first plunger reaches the input sealing tip when the permanent magnet is moved in a first direction upon generation of a magnetic field of a first polarity and lifts the input sealing tip of the input port opening, and that the second plunger rod reaches the output sealing tip upon generation of a magnetic field of opposite polarity and lifts it off the second output port opening.

In both aforementioned cases the permanent magnet may be formed by a first permanent magnet disposed within a first half of the solenoid coil with its north pole pointing in an axial direction of the solenoid coil, and a second permanent magnet disposed in the opposite half of the solenoid coil with its north pole pointing in the opposite axial direction of the solenoid coil, wherein the first second permanent magnet are connected to each other.

In a preferred embodiment a first transverse lever extends transversely to the axial direction of the solenoid coil, preferably essentially perpendicular thereto, at one end thereof and is connected with its end remote from the solenoid coil to a first actuation shaft which is rotateably mounted in the housing of the valve, wherein the first actuation shaft is further connected to a first actuation lever connected to the input sealing tip such that by moving the permanent magnet in direction towards the first transverse lever this transverse lever is pivoted and turns the first actuation shaft which in turn turns the first actuation lever and thereby lifts off the input sealing tip from the input port to open it. On the opposite end of the solenoid act there is a symmetrical arrangement of a second transverse lever, a second actuation shaft and a second actuation lever connected to the output sealing tip so that by movement of the permanent magnet in the opposite direction the second transverse lever is pivoted and turns the second actuation shaft which in turn pivots the second actuation lever which thereby lifts off the output sealing tip from the second output port. In a preferred embodiment the length of the first transverse lever is larger than the length of the first actuation lever, and the length of the second trans-verse lever is larger than length of the second actuation lever. The length of the respective levers can be chosen to achieve a desired transmission ratio between the movement of the permanent magnet and the movement of the respective sealing tip. By choosing the length of the first and second transverse levers to be larger than the length of the respective actuation levers the force exerted on the respective sealing tip is increased by a corresponding transmission ratio. The ratio of the length of the first and second transverse levers to the length of the first and second actuation levers can for example be in the range from 3 to 4 which leads to a corresponding transmission of the force exerted on the sealing tips by effector in the range 3 to 4 (with a correspondingly reduced distance by which the sealing tips are moved to open).

In a preferred embodiment the solenoid coil is surrounded by Ferro magnetic material in order to reduce the reluctance in the magnetic circle of the coil.

The invention is further directed to a vehicle seat adjustment system comprising a solenoid valve of the present invention, the input port of the solenoid valve being adapted for connection to a pressurized air source the first output port being and connected to an air cell in a vehicle seat, and a control unit which is arranged to receive voltage from a voltage supply and to selectively deliver voltage of a first polarity to the solenoid coil or voltage of a second polarity opposite to the first polarity.

BRIEF DESCRIPTION OF DRAWINGS

The invention will in the following be described in connection with preferred embodiments in the drawings in which.

DETAILED DESCRIPTION OF THE DISCLOSURE

Figure 1:
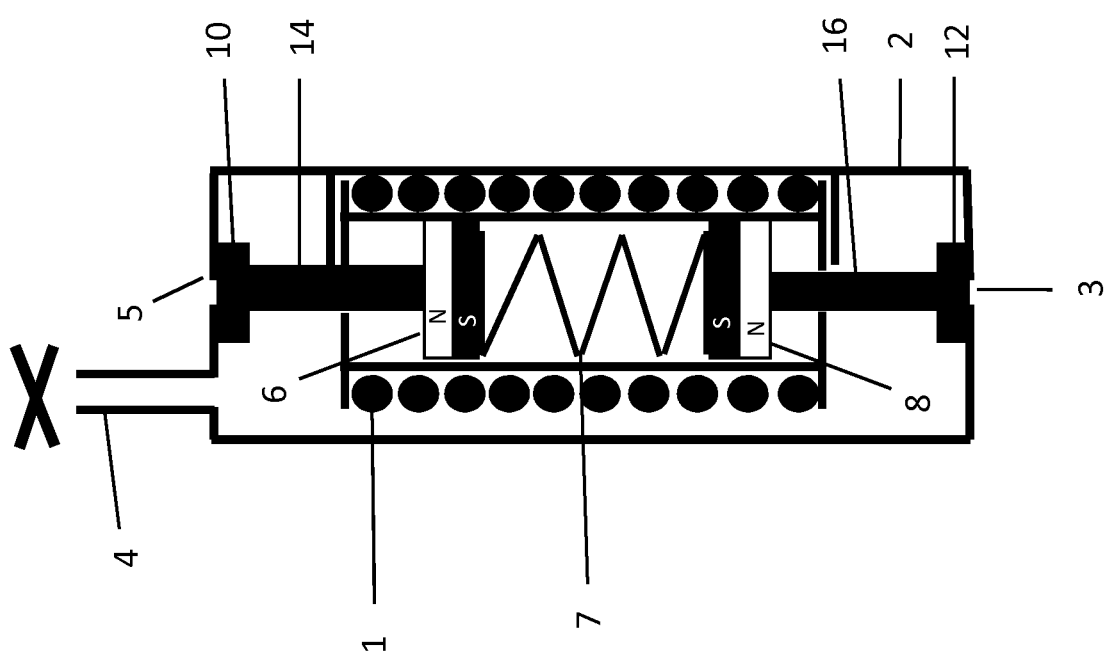
FIG. 1 shows a cross-sectional schematic view of a first embodiment of a solenoid valve in the inactivated state of the solenoid coil.
Figure 2:
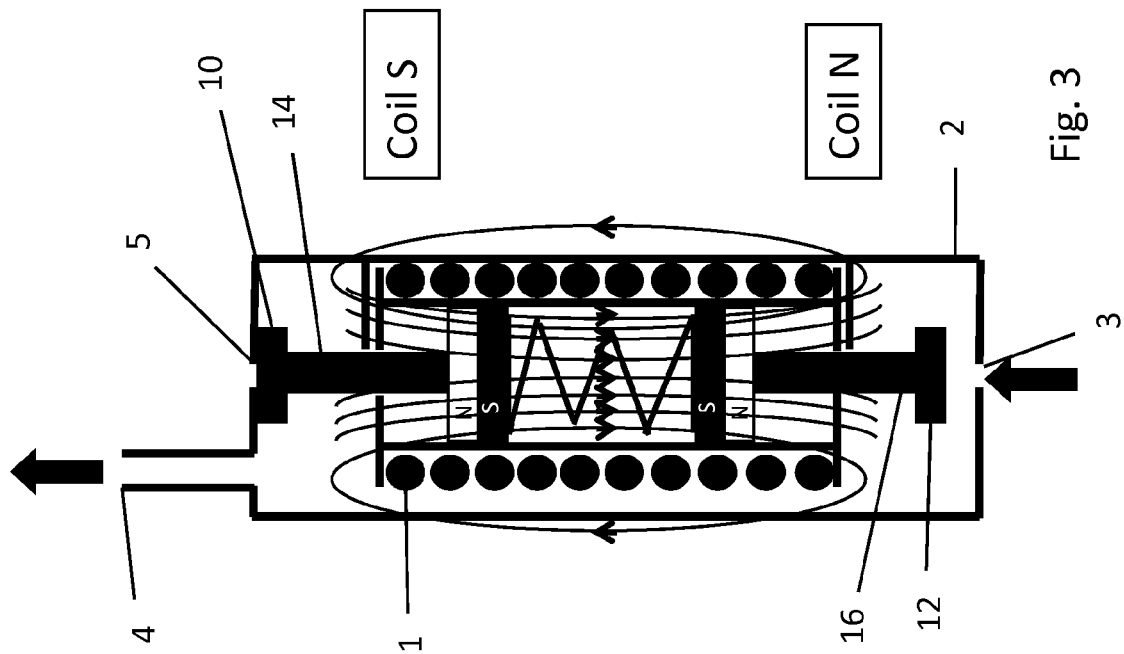
FIGS. 2 and 3 show cross-sectional views of the embodiment of FIG. 1 with a voltage of a first polarity supplied to the solenoid coil and with a voltage of opposite polarity sup-plied to the solenoid coil, respectively.
Figure 3:
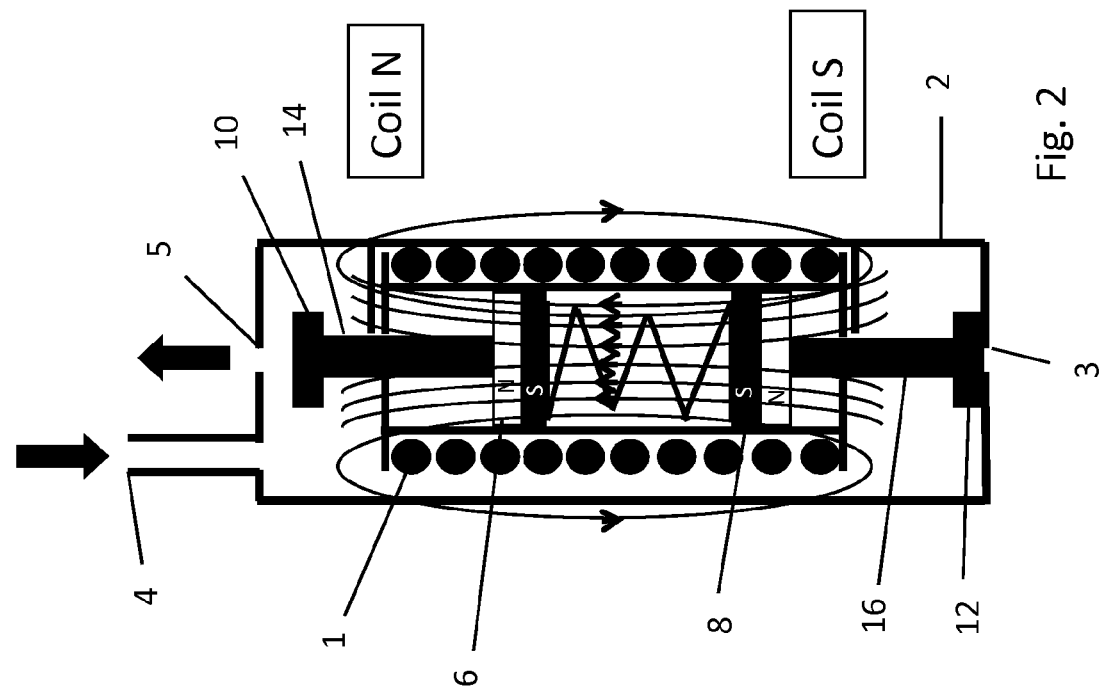

FIGS. 1 to 3 show a first embodiment of the solenoid valve, wherein the design and components of the solenoid valve will first be described in connection with FIG. 1 which shows the valve in the inactivated state. The solenoid valve has a housing 2 with an input port 3 through which pressurized air is supplied if the input port is open. The housing 2 further has a first output port 4 which is connected to an air cell. A second output port 5 in communication with the environment at most sleeve. In the inactivated state of the valve the input port 3 is closed by a sealing tip 12 which is disposed at the end of an input plunger rod 16. Correspondingly, the second output port 5 is closed by an output sealing tip 10 which is disposed on an output plunger rod 14. The output plunger rod 14 is connected to a first permanent magnet 6 which is disposed at a position in the upper half of the solenoid coil 1. The input plunger rod 16 is connected to a second permanent magnet 8 which is disposed at a position in the lower half of the solenoid coil 1. Between the first and second permanent magnets 6, 8 a spring 7 is acting which is urging them apart from each other. In this manner outwardly directed forces are exerted on the input plunger rod 16 and the output plunger rod 14 which in turn press the input sealing tip 12 on the input port 3 and the output sealing tip 10 on the second output port, respectively. Under this condition no air flows to the air cell and no air can escape therefrom so that the air cell is kept in its present state of inflation.

In order to deflate the air cell a voltage of a first polarity is applied to the solenoid coil 1 as shown in FIG. 2. This voltage to the solenoid coil 1 causes that the solenoid coil 1 generates a magnetic field as schematically indicated by the field lines shown in FIG. 2. This magnetic field has a magnetic north pole, indicated as "Coil N" at the upper end of the solenoid coil and a magnetic south pole "Coil S" at the lower end of the solenoid coil. The first and second permanent magnets 6, 8 are oriented such that the first permanent magnet 6 is moved downwardly away from the north pole of the solenoid coil; the second permanent magnet 8 is with its north pole directed by the south pole of the magnetic field of the solenoid coil 1 such that the second permanent magnet is urged in downward direction. Due to the force on the first permanent magnet in downward direction it is moved further inside the solenoid coil. This downward movement is accompanied by a corresponding downward movement of the output plunger rod 14 and the output sealing tip 10 such that it is moved away from the opening of the second output port 5. In addition the spring between the first permanent magnet 6 and the second permanent magnet 8 is slightly compressed. In this situation as shown in FIG. 2 the input port 3 is closed, whereas the second output port 5 is opened such that air under pressure can flow from the air cell through the first output port 4, the interior of the housing 2 and further through the second output port 5 to the environment. This actuation of the solenoid valve is used to deflate the air cell.

In FIG. 3 the solenoid valve is supplied with a voltage of a second polarity, opposite to the first polarity. This has the effect that a magnetic field is generated by the solenoid coil 1 which is reversed as compared to FIG. 2, i.e. in FIG. 3 the magnetic south pole "Coil S" of the magnetic field generated by the solenoid coil 1 is at the upper end and the magnetic north pole "Coil N" of the solenoid coil field is at the lower end of the coil. This oppositely directed magnetic field of the solenoid coil causes forces on the first and second permanent magnets 6, 8 in opposite directions compared to the situation shown in FIG. 2. This means that the first permanent magnet 6 experiences an upwardly directed force pressing the output plunger rod 14 and the output sealing tip 10 further onto the second output port, while an upwardly directed force is exerted on the second permanent magnet 8 which causes an upward movement of the second permanent magnet 8 which is accompanied by a corresponding upward movement of the input plunger rod 16 and the input sealing tip 12. Therefore, input sealing tip 12 is lifted off the input port 3 which is therefore opened to the connected supply of pressurized air.

The pressurized air can thus flow through the housing 2 of the valve and further to the first output port 4 to the air cell connected thereto which is thereby inflated. If the air cell is sufficiently inflated the user stops the supply of voltage to the solenoid coil 1 which then returns to the inactivated state of FIG. 1 with the input port 3 and the second output port closed.

Figure 4:
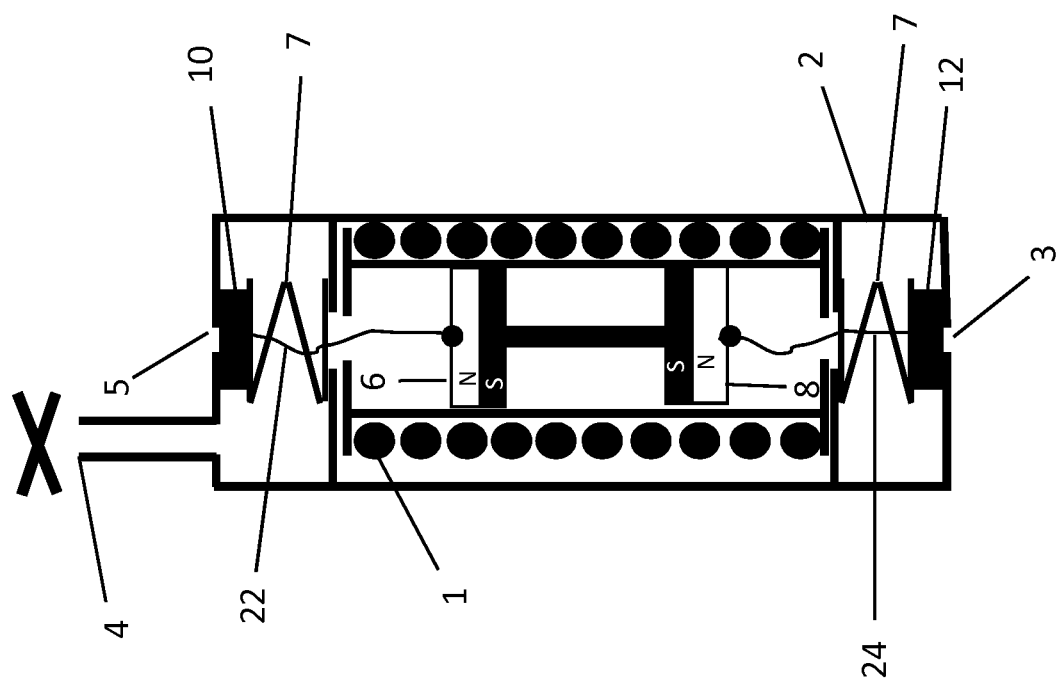
FIG. 4 shows a cross-sectional schematic view of a second embodiment in the inactivated state of the solenoid coil.

In FIG. 4 a second embodiment of the solenoid valve is shown in the inactivated state. In this case the first and second permanent magnets 6, 8 in the interior of the solenoid coil 1 are connected. The first permanent magnet 6 is connected to the output sealing tip 10 by an upwardly extending cord 22. The second permanent magnet 8 is connected to the input sealing tip 12 by a downwardly extending cord 24. The length of the cords 22, 24 are such that they are under no attention when the solenoid valve is in the inactivated state shown in FIG. 4. In this state the output sealing tip 10 and the input sealing tip 12 are pressed to the respective valve ports by respective springs 7.

Figure 5:
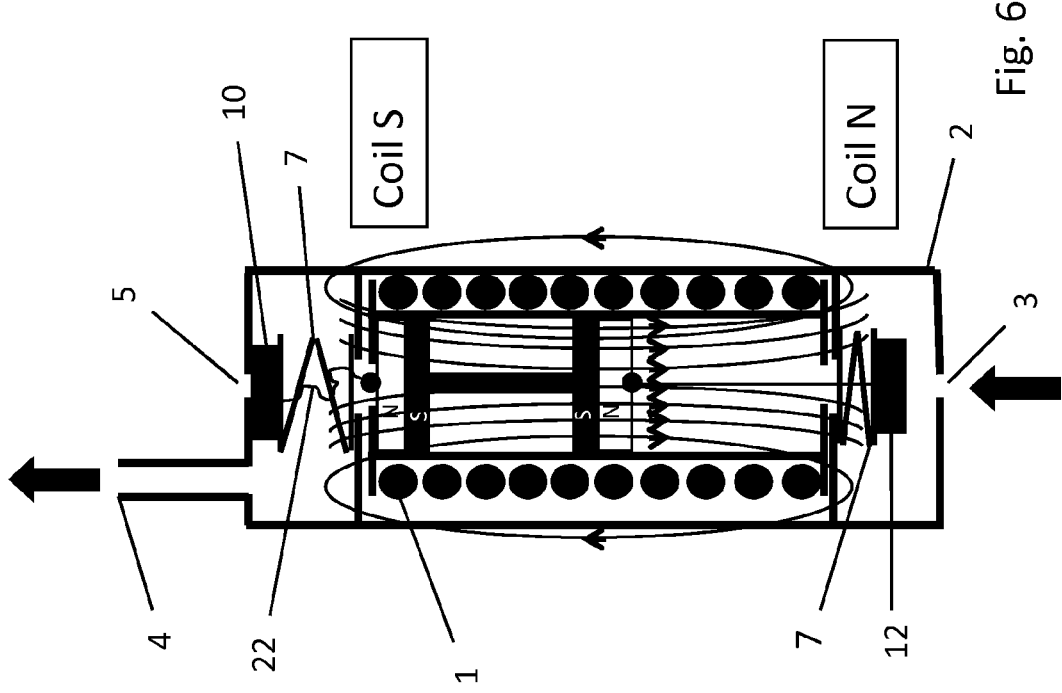
FIGS. 5 and 6 show cross-sectional views of the embodiment of FIG. 4 with a voltage of a first polarity supplied to the solenoid coil and with a voltage of opposite polarity sup-plied to the solenoid coil, respectively.

In FIG. 5 a voltage is supplied to the solenoid coil 1 which leads to the generation of a magnetic field of a first polarity, namely with the north pole of the magnetic field pointing to the upper end of the solenoid coil and the south pole pointing to the lower end of the solenoid coil. As described in connection with FIG. 2, this causes downwardly directed forces on the first and second permanent magnets 6, 8 which in turn move towards the lower end of the solenoid coil shown in FIG. 5. This has the effect that cord 22 connecting the first permanent magnet 6 to the output sealing tip 10 is tensioned, and further downward movement of the permanent magnets 6, 8 lifts off the output sealing tip 10 from the second output port 5 as shown in FIG. 5. On the other hand the second permanent magnet 8 could move closer to the input sealing tip 12 which only has the effect that the cord 24 shows more turns or curls. By applying a voltage or first polarity to the solenoid coil 1 as shown in FIG. 5 the solenoid coil is operated to deflate the air cell since air from the air cell can flow through first output port 4 and further out of the second output port 5 to the environment.

Figure 6:
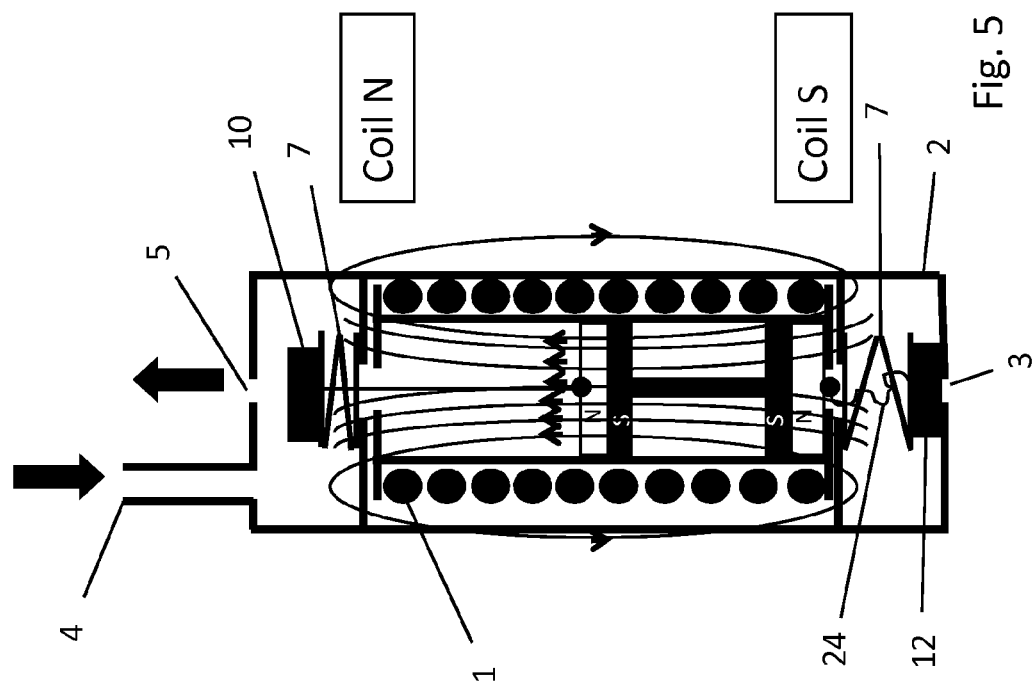

By applying a voltage of opposite polarity to the solenoid coil 1 the solenoid valve is brought to a status shown in FIG. 6 with a reversed magnetic field generated by the solenoid coil 1. This has the effect that oppositely directed forces are exerted on permanent magnets 6 and 8, which forces are now directed vertically upwardly which results in an upward movement of the permanent magnet 6, 8 as compared to the inactivated state as shown in FIG. 4. This has the effect that now cord 24 is tensioned and eventually lifts off the input sealing tip 12 from the input port 3, whereas spring 7 presses the output sealing tip 10 to the second output port 5 and the cord 22 is further loosened in this manner the input port 3 is opened so that pressurized air can flow into the housing 2 and further out of the first output port 4 to the connected air sell which is thereby inflated. If the air cell is sufficiently inflated the user stops supply of the voltage of opposite polarity to the solenoid coil 1, whereafter the solenoid valve returns to the inactivated state as shown in FIG. 4 in which the air cell is kept in its current state of inflation. It is also possible that a control unit automatically terminates voltage supply once a desired inflation state or pressure has been reached.

Figure 7:
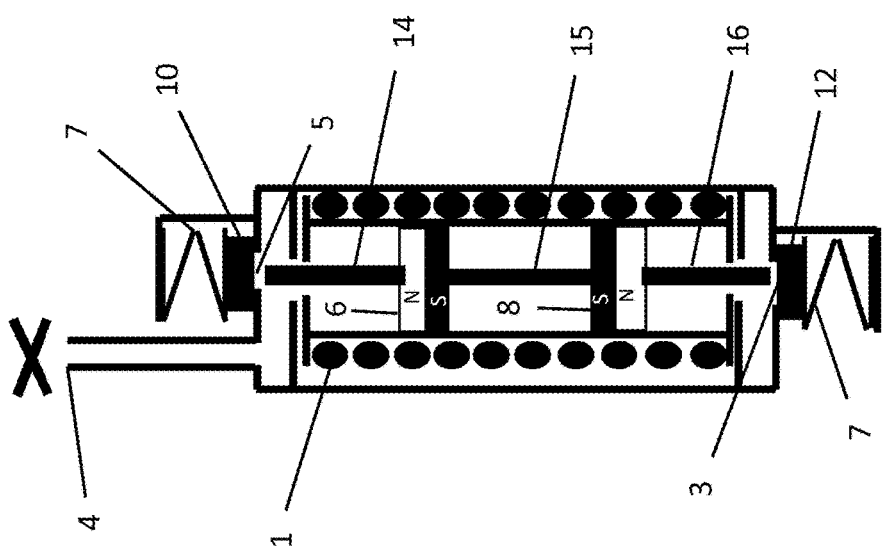
FIG. 7 shows a cross-sectional schematic view of a third embodiment in the inactivated state of the solenoid coil.

In FIG. 7 a third embodiment of the solenoid valve is shown in the inactivated state. This third embodiment is similar to the second embodiment of FIGS. 4 to 6. The differences are that there are no cords but there is a output plunger rod 14 connected to the first permanent magnet 6 and a input plunger rod 16 connected to the second permanent magnet 8 which, in the inactivated state, extend into close proximity of the output sealing tip 10 and the input sealing tip 12, respectively. In this case the output sealing tip 10 and the input sealing tip 12 are pressed from the outside of the housing 2 on the respective valve ports by respective springs 7.

Figure 8:
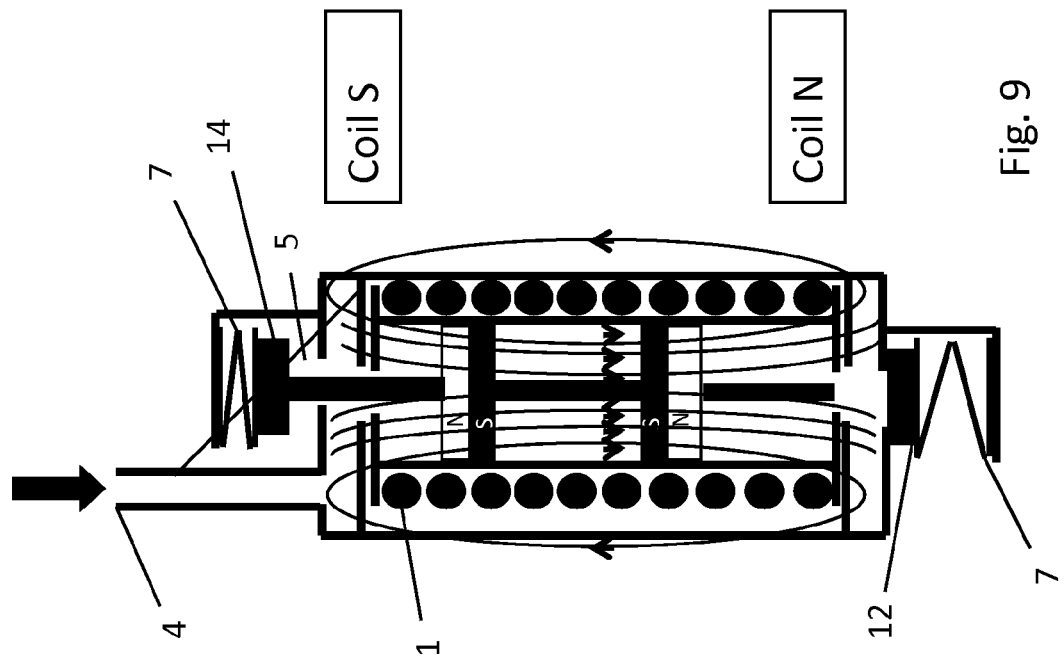
FIGS. 8 and 9 show cross-sectional views of the embodiment of FIG. 7 with a voltage of a first polarity supplied to the solenoid coil and with a voltage of opposite polarity sup-plied to the solenoid coil, respectively.
Figure 9:
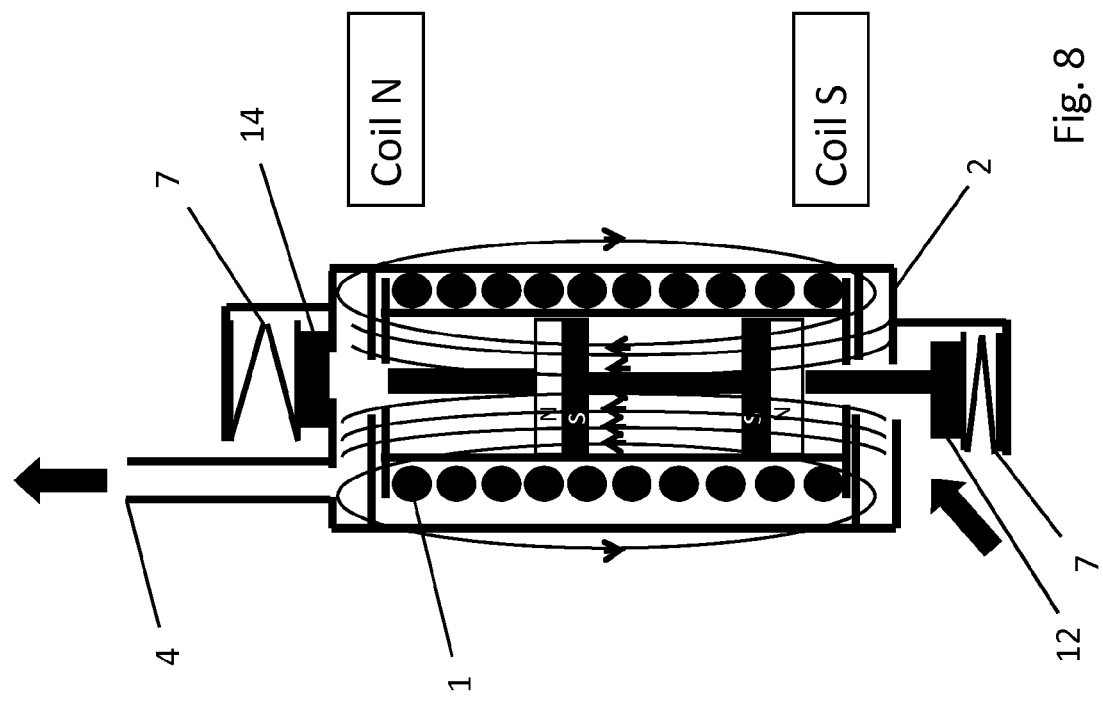
Figure 10:
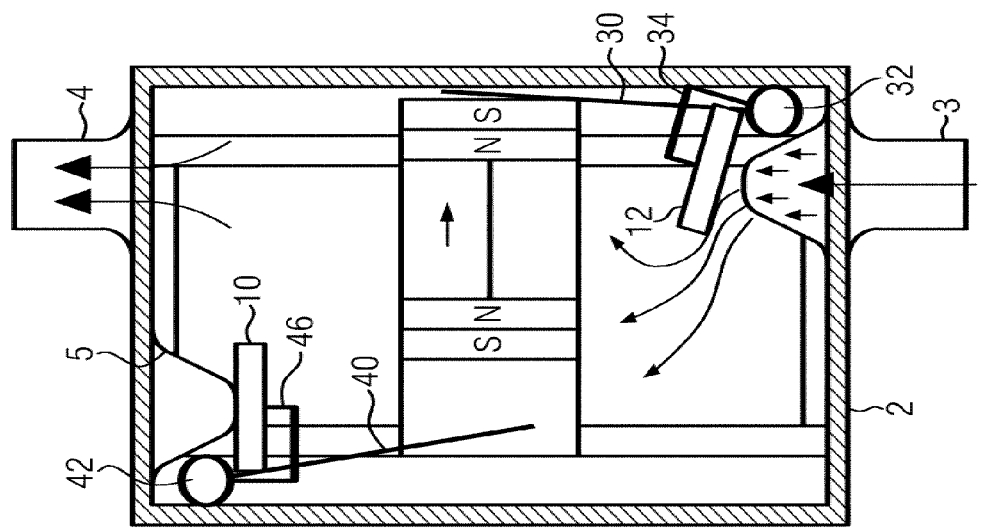
FIGS. 10 to 12 show schematic vies of a fourth embodiment in the inactivated state of the solenoid coil, with a voltage of first polarity applied, and with a voltage of second opposite polarity applied, respectively.

The application of voltages of opposite polarity to the solenoid coil 1 in FIGS. 8 and 9 is the same as in case of FIGS. 5 and 6, i.e. in FIG. 8 the permanent magnets are moved downwardly which causes input plunger rod 16 to come into abutment on input sealing tip 12 and move it away from the input port so that it is open for supply of pressurized air which flows through the first output port 4 to the air cell, while output sealing tip 14 keeps the second output port closed.

In FIG. 9 the situation is reversed for deflation of the air cell by applying an opposite polarity voltage to the solenoid coil 1 and by generating an oppositely directed magnetic field which in turn caused oppositely directed forces on the permanent magnets. This has the result that the output plunger rod 14 abuts against and lifts off output sealing tip 14 from the second output port 5, whereas the input port is closed by input sealing tip 12 urged onto the input port by spring 7.

Figure 11:
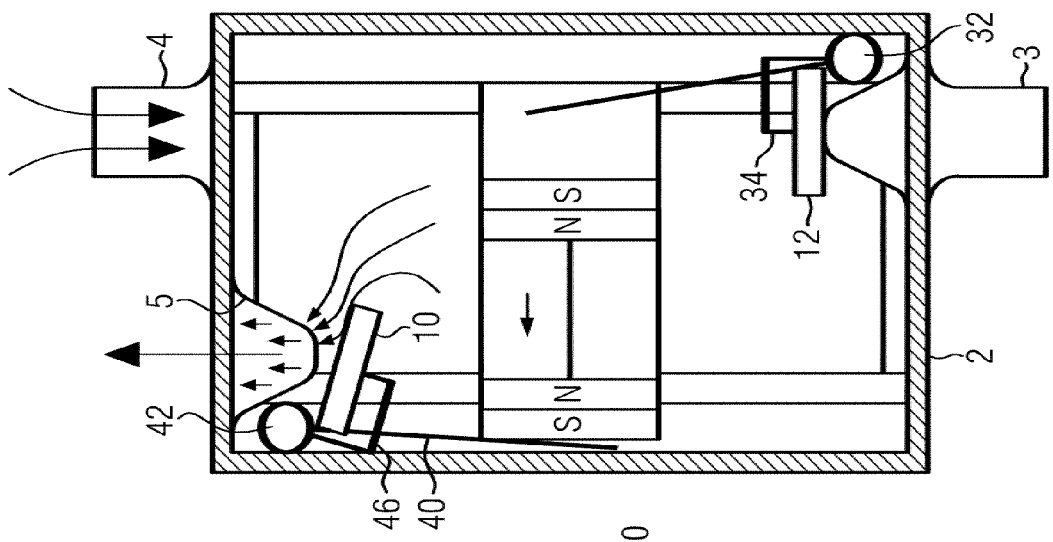
Figure 12:
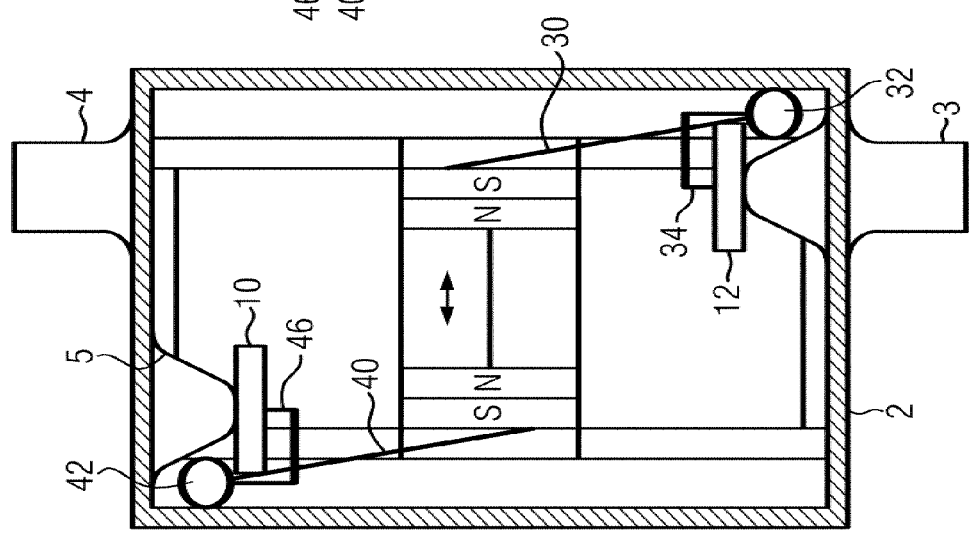
Figure 13:
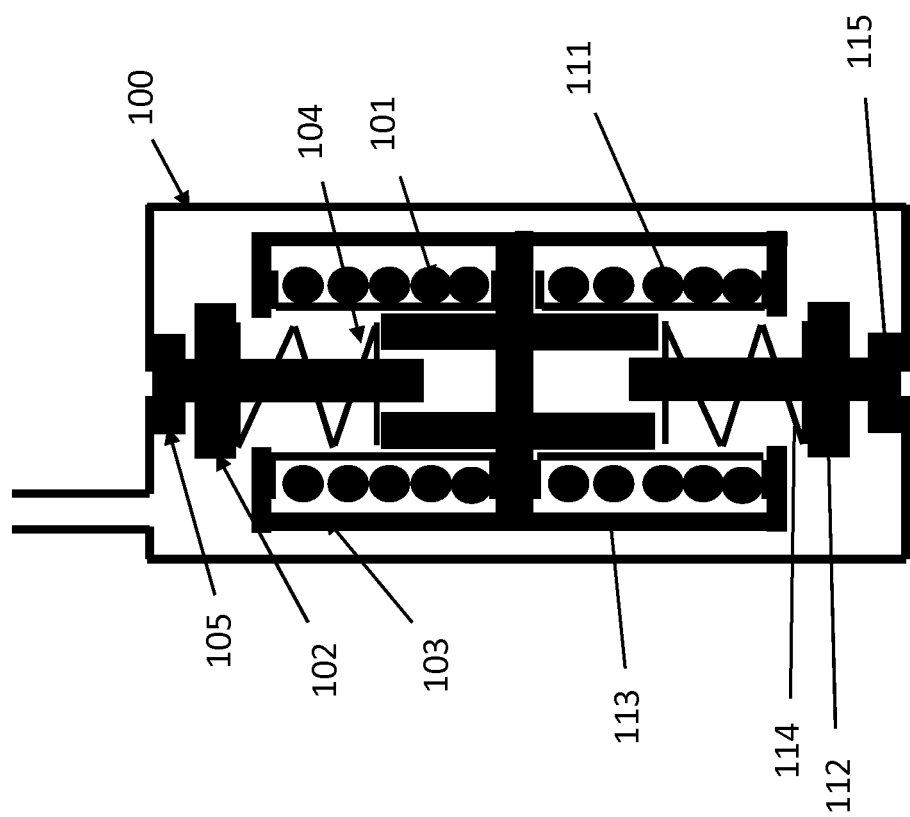
FIG. 13 shows a schematic cross-sectional view of a solenoid valve according to the prior art.

FIGS. 11 to 13 show simplify schematical views of a fourth embodiment in the inactivated state, with a voltage of first polarity applied to the solenoid coil, and with a voltage of opposite polarity, respectively. In this embodiment again two permanent magnets are located with oppositely directed poles within the inner space of the solenoid coil 1. At the first end of the solenoid coil there is located first a transverse lever 30 which extends from the opening of the solenoid coil and further to a first actuation shaft 32 which is rotateably mounted in the housing 2 of the valve. A first actuation lever 34 is connected to the first actuation shaft 32 and carries the input sealing tip 12.

At the opposite end of the solenoid coil 1 there is a corresponding arrangement of a second transverse lever 40, a second actuation shaft 42, and a second actuation lever 46 which is connected to the output sealing tip 10.

If the first and second permanent magnets are moved by a first magnetic field generated by supplying voltage of a first polarity to the solenoid coil which results in movement of the first and second permanent magnets to the left hand side in FIG. 11, the second transverse lever 40 is turned and causes a rotation of the second actuation shaft 42. The accompanying turning movement of the second actuation lever 46 lifts off the output sealing tip 10 from the second output port so that air can flow from the air cell to the environment.

By supplying a voltage of opposite polarity to the solenoid coil an oppositely directed magnetic field is generated by the solenoid coil which leads to the situation as shown in FIG. 12. The permanent magnets have moved to the right hand side which caused a turning movement of the first transverse lever 30 and a rotation of the first actuation shaft 32. This rotation caused a turning movement of the first actuation lever 34 which therefore lifted off the input sealing tip 12 from the input port 3 which is thus open for supply of pressurized air.

The first and second actuation shafts 32 and 42 may be equipped with respective torsion springs which are arranged such that the first actuation lever 34 and the input sealing tip 12 are biased towards the input port and the second actuation leer 44 and the output sealing tip 10 are biased towards the second output port 4.

The invention claimed is:

1. Solenoid valve comprising:
an input port including an input sealing tip which is spring biased for closing it, a first output port, a second output port to the environment including an output sealing tip which is spring biased for closing it, and a solenoid coil arrangement for selectively generating magnetic fields which result in a force either on the input sealing tip to pull it away from the input port for opening it or a force on the output sealing tip to pull it away from the second output port for opening it, characterized in that the solenoid valve arrangement consists of a single solenoid coil, a permanent magnet is disposed moveably in axial direction of the solenoid coil to be driven by a magnetic field of the solenoid coil of a first polarity to move in a first axial direction of the solenoid coil and by a magnetic field of opposite polarity to move in a second direction opposite to the first direction, said permanent magnet being connected to the input sealing tip and to the output sealing tip such that movement of the permanent magnet in the first direction pulls the input sealing tip away from the input port to open it while the second output port remains closed, and movement of the permanent magnet in the opposite direction pulls the output sealing tip away from the second output port to open it while the input port remains closed;
a first transverse lever that extends transversely to the axial direction of the solenoid coil at one end thereof and is connected with its end remote from the solenoid coil to a first actuation shaft rotatably mounted in the housing of the valve; and
a second transverse lever extends transversely to the axial direction of the solenoid coil at the other end thereof and is connected with its end remote from the solenoid coil to a second actuation shaft rotatably mounted in the housing of the valve.

2. A solenoid valve comprising:
an input port including an input sealing tip which is spring biased for closing it,
a first output port,
a second output port to the environment including an output sealing tip which is spring biased for closing it, and
a solenoid coil arrangement for selectively generating magnetic fields which result in a force either on the input sealing tip to pull it away from the input port for opening it or a force on the output sealing tip to pull it away from the second output port for opening it, characterized in that the solenoid valve arrangement consists of a single solenoid coil,
a first permanent magnet disposed within a first half of the solenoid coil with its north pole pointing in an axial direction of the solenoid coil, and a second permanent magnet is disposed in the opposite half of the solenoid coil with its north pole pointing in the opposite axial direction of the solenoid coil, and
wherein the first permanent magnet and the second permanent magnet are connected to the input sealing tip and to the out-put sealing tip such that movement of the first permanent magnet and the second permanent magnet in the first direction pulls the input sealing tip away from the input port to open it while the second output port remains closed, and movement of the first permanent magnet and the second permanent magnet in the opposite direction pulls the output sealing tip away from the second output port to open it while the input port remains closed.

3. Solenoid valve according to claim 2, wherein the first permanent magnet is provided with an output plunger rod projecting out of the solenoid coil and extending in the direction towards the second output port and carrying the output sealing tip, and that the second permanent magnet is connected to an input plunger rod projecting out of the solenoid coil and extending towards the input port and carrying the input sealing tip at its outer end, and that a spring arrangement is provided which results in a spring bias force urging the output plunger rod with the output sealing tip to the second output port and urging the input plunger rod with the input sealing tip to the input port.

4. Solenoid valve according to claim 3, wherein the spring arrangement comprises a spring acting between the first and second permanent magnets urging them away from each other.

5. Solenoid valve according to claim 3, wherein the first and second permanent magnets are connected to each other, and springs are acting on the input sealing tip and on the output sealing tip to urge them towards the input port and towards the second output port, respectively.

6. A solenoid valve comprising:
an input port including an input sealing tip which is spring biased for closing it, a first output port, a second output port to the environment including an output sealing tip which is spring biased for closing it, and a solenoid coil arrangement for selectively generating magnetic fields which result in a force either on the input sealing tip to pull it away from the input port for opening it or a force on the output sealing tip to pull it away from the second output port for opening it, characterized in that the solenoid valve arrangement consists of a single solenoid coil, that a permanent magnet is disposed moveably in axial direction of the solenoid coil to be driven by a magnetic field of the solenoid coil of a first polarity to move in a first axial direction of the solenoid coil and by a magnetic field of opposite polarity to move in a second direction opposite to the first direction, said permanent magnet being connected to the input sealing tip and to the output sealing tip such that movement of the permanent magnet in the first direction pulls the input sealing tip away from the input port to open it while the second output port remains closed, and movement of the permanent magnet in the opposite direction pulls the output sealing tip away from the second output port to open it while the input port remains closed;
wherein the permanent magnet is connected to the input sealing tip by a first flexible cord and is connected to the output sealing tip by a second flexible cord extending in the opposite direction to the first cord, and wherein springs are arranged to exert bias force on the input sealing tip towards the input port and the output sealing tip towards the second output port, wherein the lengths of the first and second cords are dimensioned such that the first and second cords are under no tension when the solenoid coil is inactivated and that a respective one of the sealing tips is lifted off its port by a pulling force exerted through the respective cord when the solenoid coil is activated by a voltage of a respective polarity.

7. Solenoid valve according to claim 1, wherein the permanent magnet is provided with an input plunger rod extending therefrom towards the input sealing tip and an output plunger rod extending therefrom in the opposite direction towards the output sealing tip, wherein the input sealing tip is spring-biased to be pressed onto the input port opening from the outside, and the output sealing tip is spring-biased to be pressed on the second output port opening from the outside, and wherein the plunger rods each have a sufficient length such that the input plunger rod reaches the input sealing tip when the permanent magnet is moved in a first direction upon generation of a magnetic field of a first polarity and lifts the input sealing tip off the input port opening, and that the output plunger rod reaches the output sealing tip upon generation of a magnetic field of opposite polarity to lift it off the second output port opening.

8. Solenoid valve according to claim 6, wherein the permanent magnet is formed by a first permanent magnet disposed within a first half of the solenoid coil with its north pole pointing in an axial direction of the solenoid coil, and a second permanent magnet disposed in the opposite half of the solenoid coil with its north pole pointing in the opposite axial direction of the solenoid coil, wherein the first and second permanent magnet are connected to each other.

9. Solenoid valve according to claim 1, wherein:

the first actuation shaft is connected to a first actuation lever connected to the input sealing tip such that by moving the permanent magnet in direction towards the first transverse lever it is pivoted and turns the first actuation shaft which turns the first actuation lever and thereby lifts off the input sealing tip from the input port to open it, and the second actuation shaft is connected to a second actuation lever connected to the output sealing tip such that by moving the permanent magnet in direction towards the second transverse lever it is pivoted and turns the second actuation shaft which turns the second actuation lever and thereby lifts off the output sealing tip from the second output port to open it.

10. Solenoid valve according to claim 9, wherein the length of the first transverse lever is larger than the length of the first actuation lever and that the length of the second transverse lever is larger than the length of the second actuation lever.

11. Solenoid valve according to claim 10, wherein the solenoid coil is sur-rounded by ferromagnetic material in order to reduce the reluctance in the magnetic circle of the coil.

12. A vehicle seat adjustment system comprising, a solenoid valve according to claim 1 for connection with its input port to a pressurized air source and connected with its first output port to an air cell in a vehicle seat, a control unit which is arranged to receive voltage from a voltage supply and to selectively supply voltage of a first polarity to the solenoid coil or voltage of a second polarity opposite to the first polarity.

* * * * *